United States Patent
Jin et al.

(10) Patent No.: US 10,025,451 B2
(45) Date of Patent: Jul. 17, 2018

(54) METHOD AND ELECTRONIC DEVICE FOR MANAGING SCREEN

(71) Applicant: Samsung Electronics Co., Ltd, Gyeonggi-do (KR)

(72) Inventors: Jeong Gyu Jin, Suwon-si (KR); Ho Shin Lee, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 380 days.

(21) Appl. No.: 14/708,006

(22) Filed: May 8, 2015

(65) Prior Publication Data

US 2015/0324080 A1   Nov. 12, 2015

(30) Foreign Application Priority Data

May 9, 2014   (KR) ........................ 10-2014-0055192

(51) Int. Cl.
*G06F 3/048*   (2013.01)
*G06F 3/0481*   (2013.01)
*G06F 3/0485*   (2013.01)
*G06F 3/0488*   (2013.01)

(52) U.S. Cl.
CPC .......... *G06F 3/0481* (2013.01); *G06F 3/0485* (2013.01); *G06F 3/0488* (2013.01)

(58) Field of Classification Search
CPC . G06F 3/0485; G06F 3/04886; G06F 3/04855
See application file for complete search history.

(56) References Cited

U.S. PATENT DOCUMENTS

| | | | |
|---|---|---|---|
| 8,624,953 B2 | 1/2014 | Joshi et al. | |
| 2010/0231612 A1* | 9/2010 | Chaudhri | G06F 3/04886 345/684 |
| 2011/0069017 A1* | 3/2011 | Victor | G06F 3/0482 345/173 |
| 2012/0102549 A1* | 4/2012 | Mazzaferri | G06F 21/6218 726/4 |
| 2012/0262539 A1 | 10/2012 | Joshi et al. | |
| 2013/0002592 A1* | 1/2013 | Chaudhri | G06F 3/04886 345/173 |
| 2013/0174082 A1* | 7/2013 | Khandker | G06F 3/0485 715/780 |
| 2013/0298072 A1 | 11/2013 | Lee et al. | |
| 2014/0123052 A1* | 5/2014 | Chaudhri | G06F 3/04886 715/773 |

FOREIGN PATENT DOCUMENTS

KR   20130123146 A   11/2013

* cited by examiner

*Primary Examiner* — Claudia Dragoescu

(57) ABSTRACT

An electronic device screen management method includes: displaying a first display area and a second display area on a display; and gradually changing the second display area in correspondence to a scroll operation occurring from the first display area.

20 Claims, 11 Drawing Sheets

METHOD AND ELECTRONIC DEVICE FOR MANAGING SCREEN

CROSS-REFERENCE TO RELATED APPLICATION AND CLAIM OF PRIORITY

The present application is related to and claims priority under 35 U.S.C. § 119(a) to the, Korean patent application No. 10-2014-0055192 filed May 9, 2014, the entire contents of which are incorporated herein by reference.

TECHNICAL FIELD

The present application relates generally to screen management.

BACKGROUND

Electronic devices such as smartphones and tablets provide various useful functions to users through several various applications. Accordingly, there is a tendency that the display areas of electronic devices are expanded in relation to various information provisions.

Various information is displayed in an expanded display area. However, even when an expanded display area is provided, specific information display may interfere with another information display. For example, when a virtual input pad is outputted to a screen, since it occupies a predetermined area, information is displayed in a limited manner.

SUMMARY

To address the above-discussed deficiencies, it is a primary object to provide a screen management method and device for performing an adaptive display processing on a specific region or a specific area (or a specific layer) in comparison to a management of another area (or another layer) in a screen including a plurality of display areas (or a plurality of layers).

Various embodiments of the present disclosure are directed to providing a screen management method and electronic device for adaptively performing a display processing of a virtual input pad in response to a user input.

According to various embodiments of the present disclosure, an electronic device screen management method includes: displaying a first display area and a second display area on a display; and gradually changing the second display area in correspondence to a scroll operation occurring from the first display area.

According to another embodiment of the present disclosure, an electronic device includes: a display configured to display a first display area and a second display area; and a display control module configured to gradually change the second display area in correspondence to a scroll operation occurring from the first display area.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
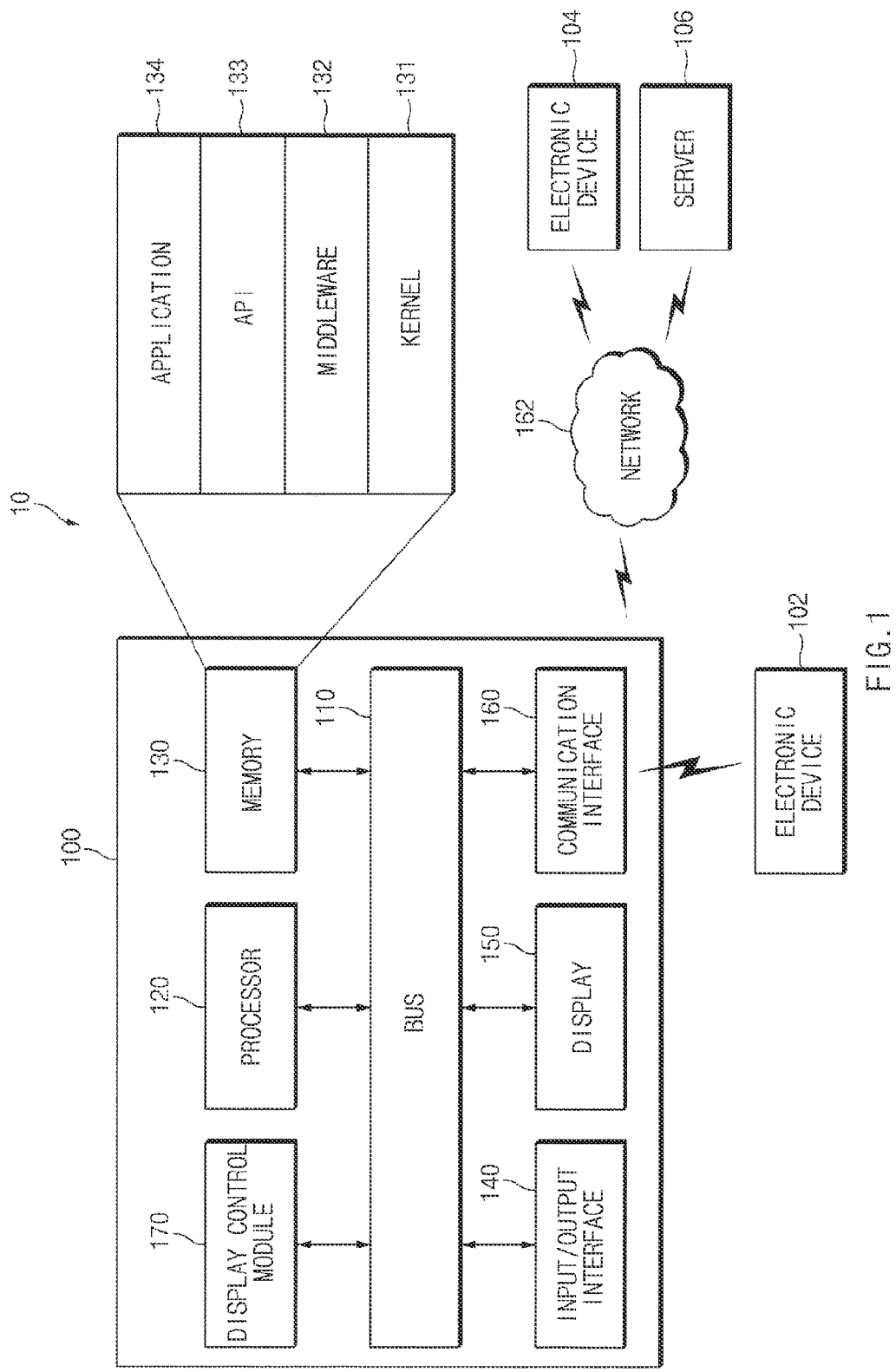
FIG. 1 illustrates a screen management system according to various embodiments of the present disclosure.

FIGS. 1 through 11, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication device. Hereinafter, preferred embodiments of the present disclosure will be described in more detail with reference to the accompanying drawings. Additionally, detailed descriptions for known functions and configurations that unnecessarily obscure the subject matter of the present disclosure may be omitted.

The expression "include," "comprise," "including," or "comprising," used in this disclosure specifies a corresponding function, operation or component but does not limit at least one additional function, operation, or component. Additionally, in this disclosure, the term "include," "comprise," "including," or "comprising," specifies a property, a region, a fixed number, a step, a process, an element and/or a component but does not exclude other properties, regions, fixed numbers, steps, processes, elements or components.

In this disclosure, the expression "or" includes any or all combinations of the words connected by the term "or." For instance, the expression "A or B" can indicate include A, B, or both A and B.

The expressions such as "1st," "2nd," "first," "second," and the like used herein modify various components of various embodiments but do not limit corresponding components. For instance, such expressions do not limit the order or importance of corresponding components. The expressions can be used to distinguish one element from another element. For instance, both "a first user device" and "a second user device" indicate a user device but indicate different user devices from each other. For example, a first component can be referred to as a second component and vice versa without departing from the scope of the present disclosure.

When one part (or element, device, etc.) is referred to as being "connected" to another part (or element, device, etc.), it should be understood that the former can be "directly connected" to the latter, or "connected" to the latter via an intervening part (or element, device, etc.). In certain embodiments, when an element is referred to as being "directly connected" or "directly coupled" to another element, there are no intervening elements present.

Terms used in this disclosure are used to describe specific embodiments, and are not intended to limit the scope of the present disclosure. The terms of a singular form may include plural forms unless they have a clearly different meaning in the context.

Otherwise indicated herein, all the terms used herein, which include technical or scientific terms, may have the same meaning that is generally understood by a person skilled in the art. In general, the terms defined in the dictionary should be considered to have the same meaning as the contextual meaning of the related art, and, unless clearly defined herein, should not be understood abnormally or as having an excessively formal meaning.

An electronic device according to this disclosure may be a device supporting a screen scroll function. For instance, electronic devices may include at least one of smartphones, tablet personal computers (PCs), mobile phones, video phones, electronic book (e-book) readers, desktop PCs, laptop PCs, netbook computers, personal digital assistants (PDAs), portable multimedia player (PMPs), MP3 players, mobile medical devices, cameras, and wearable devices (such as head-mounted-devices (HMDs) such as electronic glasses, electronic apparel, electronic bracelets, electronic necklaces, electronic appcessories, electronic tattoos, and smart watches).

According to some embodiments, an electronic device may be smart home appliances having a screen scroll function. The smart home appliances may include at least one of, for example, televisions, digital video disk (DVD) players, audios, refrigerators, air conditioners, cleaners, ovens, microwave ovens, washing machines, air cleaners, set-top boxes, TV boxes (such as SAMSUNG HOMESYNC™, APPLE TV™ or GOOGLE TV™), game consoles, electronic dictionaries, electronic keys, camcorders, and electronic picture frames.

According to some embodiments, an electronic device may include at least one of various medical devices (for example, magnetic resonance angiography (MRA) devices, magnetic resonance imaging (MRI) devices, computed tomography (CT) devices, medical imaging devices, ultrasonic devices, etc.), navigation devices, global positioning system (GPS) receivers, event data recorders (EDRs), flight data recorders (FDRs), vehicle infotainment devices, marine electronic equipment (for example, marine navigation systems, gyro compasses, etc.), avionics, security equipment, and industrial or household robots.

According to some embodiments, an electronic device may include at least one of furniture or buildings/structures having a screen scroll function, electronic boards, electronic signature receiving devices, projectors, and various measuring instruments (for example, water, electricity, gas, or radio signal measuring instruments). An electronic device according to this disclosure may be one of the above-mentioned various devices or a combination thereof. Furthermore, it is apparent to those skilled in the art that an electronic device according to this disclosure is not limited to the above-mentioned devices.

Hereinafter, an electronic device according to various embodiments will be described in more detail with reference to the accompanying drawings. The term "user" in various embodiments may refer to a person using an electronic device or a device using an electronic device (for example, an artificial intelligent electronic device).

FIG. 1 illustrates a screen management system according to various embodiments of the present disclosure.

Referring to FIG. 1, according to various embodiments, a screen management system 10 may include an electronic device 100, external electronic devices 102 and 104, a server device 106, and a network 162.

In the above-mentioned screen management system 10, the network 162 may support a communication channel establishment between the electronic device 100 and the electronic device 104. The network 162, for example, may include network device components relating to a mobile communication channel establishment. In certain embodiments, the network 162 may include network device components relating to an internet communication channel establishment. The network 162 may support data transmission or reception between the electronic device 100 and the electronic device 104. Additionally, the network 162 may support data transmission or reception between the electronic device 100 and the server device 106. According to various embodiments, the network 162 may deliver scrollable information (for example, information where a plurality of lists are disposed or a scrollable page (for example, a virtual webpage provided from the electronic device 104 according to a connection between the electronic device 104 and the server device 106) having a screen or image size greater than a display size of the electronic device 100) provided from the electronic device 104 or the server device 1066 to the electronic device 100.

The server device 106 may establish a communication channel with the electronic device 100 or the electronic device 104. According to various embodiments, the network may deliver scrollable information to the connected electronic device 100 or electronic device 104. Scrollable information provided from the server device 106 to the electronic device 100 or the electronic device 104, for example, a virtual page, may be displayed in first display areas (or virtual first display areas (or layers) of displays of corresponding devices. A virtual page provided from the server device 106 may change its screen in correspondence to a scroll function. According to various embodiments, a virtual input pad provided from the electronic device 100 or the electronic device 104 may be disposed in a second display area (or a virtual second display area (or layer)) of a display on a virtual page provided from the server device 106.

The electronic device 102 may establish a communication channel with a communication interface 160 of the electronic device 100. For example, the electronic device 102 may establish a short range communication channel or a wired communication channel with the communication interface 160. According to various embodiments, the electronic device 102 may establish a BLUETOOTH communication channel or a WiFi direct communication channel with the communication interface 160. The electronic device 102 may provide scrollable information to the electronic device 100. According to various embodiments, a plurality of electronic devices 102 may be scanned in correspondence to a scan operation of the electronic device 100. In certain embodiments, items corresponding to the plurality of electronic devices 102 may be displayed as a scrollable list page. According to an embodiment, the electronic device 102 may be prepared with a wearable type responding to a scan operation of the electronic device 100.

The electronic device 104 may establish a communication channel with the electronic device 100 through the network 162. For example, the electronic device 104 may include a cellular communication module and may establish a mobile communication channel with the electronic device 100. In certain embodiments, the electronic device 104 may include a WiFi communication module and may establish a mobile communication channel with the electronic device 100. The electronic device 104 may transmit scrollable information to the electronic device 100. According to various embodiments, the electronic device 104 may establish a chatting channel with the electronic device 100 and transmit/receive a chatting message to/from the electronic device 100. A screen including a chatting message transmitted/received to/from the electronic device 104 may be displayed as scrollable information in the electronic device 100.

The electronic device 100 may establish a communication channel with at least one of the electronic devices 102 and 104 and the server device 106. The electronic device 100 may display a screen relating to other devices establishing a communication channel. A screen outputted by the electronic device 100 may be scrollable information. According to various embodiments, the electronic device 100 may move or copy an object displayed on a specific display to another display in response to a user input. Additionally, the electronic device 100 may display, in a second display area, event related information (for example, a virtual input pad and at least one virtual control key button) for generating an input event relating to a text input or an application control. The second display area in the electronic device 100 may be overlaid to cover a portion of the first display area. In certain embodiments, the electronic device 100 may divide a display area of a display and may dispose scrollable information and event related information in the divided display areas. Accordingly, the electronic device 100 may dispose the scrollable information and the event related information on the same layer. The above electronic device 100 may change a display form of event related information in correspondence to an event occurring in a display area (or on a layer) where scrollable information is disposed.

Referring to FIG. 1, the electronic device 100 may include a bus 110, a processor 120, a memory 130, an input/output interface 140, a display 150, a communication interface 160, undo display control module 170.

The bus 110 may be a circuit connecting the above-mentioned components and delivering a communication (for example, a control message, an input event, and data) between the above-mentioned components. For example, the bus 110 may deliver an input signal inputted from the input/output interface 140 to at least one of the processor 120 and the display control module 170. The bus 110 may deliver scrollable information to at least one of the processor 120 and the display control module 170. For example, the bus 110 may deliver first display area information (for example, scrollable information) stored in the memory 130 to the display 150 in correspondence to a control of the display control module 170. The bus 110 may deliver second display area information stored in the memory 130 to the display 150 in correspondence to a control of the display control module 170.

The processor 120, for example, may receive instructions from the above-mentioned other components (for example, the memory 130, the input/output interface 140, the display 150, the communication interface 160, and the display control module 170) through the bus 110. The processor 120 may interpret the received instructions and may execute calculation or data processing according to the interpreted instructions. Such the processor 120 may be prepared in a form including the display control module 170 or in a form separated from the display control module 170. The processor 120 may perform communication with other components on the basis of the bus 110 or directly. The processor 120 may support first display area information and second display area information output processing according various embodiments and signal processing relating to a change control of information according to an input event.

The memory 130 may store instructions or data received from the processor 120 or the other components (for example, the input/output interface 140, the display 150, the communication interface 160, and the display control module 170) or generated by the processor 120 or the other components. The memory 130, for example, may include programming modules such as a kernel 131, a middleware 132, an application programming interface (API) 133, or an application 134. Each of the above-mentioned programming modules may be configured with software, firmware, hardware, or a combination of at least two thereof.

The kernel 131 may control or manage system resources (for example, the bus 110, the processor 120, or the memory 130) used for performing operations or functions implemented in the remaining other programming modules, for example, the middleware 132, the API 133, or the application 134. Additionally, the kernel 131 may provide an interface for performing a controlling or managing operation by accessing an individual component of the electronic device 100 from the middleware 132, the API 133, or the application 134.

The middleware 132 may serve as an intermediary role for exchanging data as the API 133 or the application 134 communicates with the kernel 131. Additionally, in relation to job requests received from the application 134, the middleware 132, for example, may control (for example, scheduling or load balancing) for the job requests by using a method of assigning a priority for using a system resource (for c, the bus 110, the processor 120, or the memory 130) of the electronic device 100 to at least one application among the applications 134.

The API 133 may be an interface for allowing the application 134 to control a function provided from the kernel 131 or the middleware 132. The API 133, for example, may include at least one interface or function (for example, an instruction) for file control, window control, image processing, or character control.

According to various embodiments, the application 134 may include SMS/MMS applications, e-mail applications, calendar applications, notification applications, health care applications (for example, applications for measuring exercise amount or blood glucose), or environmental information applications (for example, applications for providing pressure, humidity, or temperature information). In certain embodiments, the application 134 may be an application relating to information exchange between the electronic device 100 and an external electronic device (for example, the electronic device 102 or 104). The information exchange related application, for example, may include a notification relay application for relaying specific information to the external device or a device management application for managing the external electronic device.

For example, the notification relay application may include a function for relaying to an external electronic device (for example, the electronic device 102 or 104) notification information occurring from another application (for example, an SMS/MMS application, an e-mail application, a health care application, or an environmental information application) of the electronic device 100. In certain embodiments, the notification relay application may receive notification information from an external electronic device (for example, the electronic device 102 or 104) notification and then provide the received notification information to a user. The device management application, for example, may manage (for example, install, delete, or update) at least part of function (turn on or turn off the external electronic device itself or some components or the brightness or resolution adjustment of a display) of an external electronic device (for example, the electronic device 102 or 104) communicating with the electronic device 100, an application operating in the external electronic device, or a service (for example, call service or message service) provided from the external device.

According to various embodiments, when an external electronic device is an MP3 player, the application 134 may include an application relating to music playback. Similarly, when an external electronic device is a mobile medical device, the application 134 may include an application relating to heath care. According to an embodiment, the application 134 may include a function for displaying scrollable information. The application 134 may include a function for outputting and managing a second display area according to a setting or input event when specific information (for example, scrollable information) is disposed in a first display area in correspondence to a specific function performance. For example, the application 134 may include a virtual input pad control function. The virtual input pad control function may include program routines (for example, at least one of at least one instruction set, function, syntax, class, and template relating to a virtual input pad operation) for processing at least one of the modification, removal, and restoration of a virtual input pad in correspondence to the type of an input event occurring on a first display area.

According to various embodiments, when a specified input event occurs, the memory 130 may include setting information set to output a second display area. The memory 130 may store second display area related information (for example, as virtual input pad information, virtual QWERTY keypad information, numeric keypad information, special character information, a changed image (a size reduced or enlarged image and a transparency changed image) information of the virtual input pad).

The input/output interface 140 may deliver an instruction or data inputted from a user through an input/output device (for example, a sensor, a keyboard, or a touch screen) to the processor 120, the memory 130, the communication interface 160, or the display control module 170 through the bus 110. For example, the input/output interface 140 may provide an event (for example, a drag event or a flick event on a first display area) for a touch inputted through a touch screen to the processor 120 or the display control module 170. Additionally, the input/output interface 140 may output, through the input/output device (for example, a speaker or a display), instructions or data received from the processor 120, the memory 130, the communication interface 160, or the display control module 170 through the bus 110. According to various embodiments, the input/output interface 140 may include a physical key button (for example, a home key, a side key, and a power key), a jog key, and a keypad. The input/output interface 140 may include a virtual keypad outputted to the display 150 as an input device.

According to various embodiments, the input/output interface 140 may perform a function relating to audio processing. In relation to this, the input/output interface 140 may include one or more of at least one of a speaker and a microphone. The input/output interface 140, for example, may output audio data relating to a screen outputted to the display 150 through a speaker according to a control of the display control module 170. According to an embodiment, the input/output interface 140 may output a specified sound effect or guiding sound effect if a second display area is changed in correspondence to a touch or hovering event (for example, an event occurring by a user finger or electronic pen) occurring on a first display area. The input/output interface 140 may output a specified sound effect or guiding sound effect when the changed second display area is restored. The audio data output of the above-mentioned input/output interface 140 may be omitted in correspondence to a user setting or whether the electronic device 100 supports it.

The display 150 may display various information (for example, multimedia data or text data). For example, the display 150 may output a lock screen and a standby screen. The display 150 may output a specific function execution screen, for example, a sound source playback application (app) execution screen, a video playback app execution screen, and a broadcast reception screen, in correspondence to a function execution. According to an embodiment, the display 150 may display a first display area including scrollable information. In certain embodiments, the display 150 may display first display area including scrollable information and a second display area supporting an information input relating to the scrollable information. The first display area and the second display area may be disposed on different layers. In certain embodiments, according to various embodiments, the first display area and the second display area may be respectively disposed on the divided display areas of the display 150. The second display area may be changed in correspondence to an event (for example, a scroll related event) occurring on the first display area. Additionally, the second display area may maintain a change state or may be restored in relation to the event.

The communication interface 160 may connect a communication between the electronic device 100 and an external device for example, at least one of the electronic devices 102 and 104 and the server device 106). For example, the communication interface 160 may communicate with the external device in connection to the network 162 through wireless communication or wired communication. The wireless communication, for example, may include at least one of wireless fidelity (Wi-Fi), BLUETOOTH (BT), near field communication (NFC), global positioning system (GPS), and cellular communication (for example, LTE, LTE-A, CDMA, WCDMA, UMTS, WiBro, or GSM). The wired communication may include at least one of universal serial bus (USB), high definition multimedia interface (HDMI), recommended standard 232 (RS-232), and plain old telephone service (POTS), for example.

According to various embodiments, the network 162 may be telecommunications network. The telecommunications network may include at least one of computer network, internet, internet of things, and telephone network. According to an embodiment of the present disclosure, a protocol (for example, transport layer protocol, data link layer protocol, or physical layer protocol) for communication between the electronic device 100 and an external device may be supported by at least one of the application 134, the application programming interface 133, the middleware 132, the kernel 131, and the communication interface 160.

The communication interface 160 may include a plurality of communication modules when the electronic device 100 supports a plurality of communication methods. For example, the electronic device 100 may include a communication module, for example, a short range communication module or direct communication module capable of establishing a direct communication channel with the electronic device 102. The short range communication module or the direct communication module may include at least one of various communication modules such as a WiFi direct communication module, a BLUETOOTH communication module, and a ZIGBEE communication module. In certain embodiments, the direct communication module may include a wired communication module such as cable.

According to an embodiment, the communication interface 160 may receive scrollable information from at least one of the electronic device 102 or 104 and the server device 106. The received scrollable information may be stored in the memory 130 or outputted to the display 150.

The display control module 170 may process at least part of information obtained from other components (for example, the processor 120, the memory 130, the input/output interface 140, or the communication interface 160) and may output the processed information through various methods. For example, the display control module 170 may control to output scrollable information to a first display area and scrollable information related information to a second display area.

Figure 2:
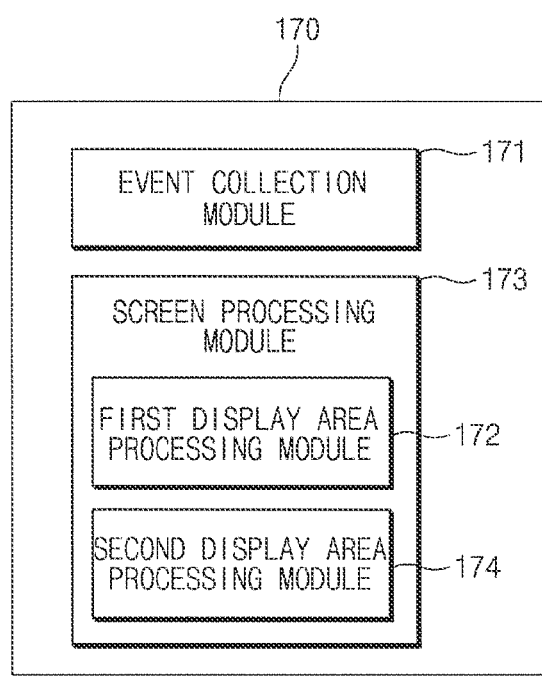
FIG. 2 illustrates a display control module of an electronic device according to various embodiments of the present disclosure.

FIG. 2 illustrates a display control module of an electronic device according to various embodiments of the present disclosure.

Referring to FIG. 2, a display control module 170 may include an event collection module 171 and a screen processing module 173. The screen processing module 173 may include a first display area processing module 172 and a second display area processing module 174.

The event collection module 171 may collect an event of the electronic device 100. For example, the event collection module 171 may collect a key event according to a key selection included in the input/output interface 410 and a touch event according to a predetermined area touch of the display 150. Additionally, when the electronic device 100 includes a sensor module, the event collection module 171 may collect a sensor event corresponding to a movement of the electronic device 100. Additionally, the event collection module 171 may collect an event relating to schedulable information in corresponding to set schedule information.

The event collection module 171 may provide a set schedule event or a collected event to the screen processing module 173. For example, when an event relating to specific information (for example, scrollable information) display occurs, the event collection module 171 may provide a corresponding event to the screen processing module 173. Additionally, the event collection module 171 may provide a touch event occurring when scrollable information is displayed in a first display area to the screen processing module 173. The event collection module 171 may provide a type of a touch event and position information of a touch event to the screen processing module 173.

The screen processing module 173 may control to output a first display area including scrollable information in correspondence to an event that the event collection module 171 provides. The screen processing module 173 may control to output a virtual input pad relating to a first display area to a second display area of the display 150 by default. In certain embodiments, the screen processing module 173 may control to output a virtual output pad to a second display area of the display 150 in correspondence to an event occurring after a first display area is outputted.

The first display area processing module 172 may control to output schedulable information through a first display area in correspondence to an event that the event collection module 171 provides. For example, the first display area processing module 172 may control to output a first display area including a phone book list to the display 150 in correspondence to an event occurrence. Additionally, the first display area processing module 172 may control to output scrollable information having a larger screen than the display 150 as a first display area to the display 150.

When an event (for example, a scroll event such as a drag event or a flick event relating to a first display area is received from the event collection module 171, the first display area processing module 172 may process a scroll function of a first display area in correspondence to a corresponding event. According to an embodiment, the first display area processing module 172 may control to allow a first display area to scroll in a vertical, horizontal, or diagonal direction in correspondence to the type and direction of an event. The first display area processing module 172 may change the size of a first display area white the first display area scrolls. For example, the first display area processing module 172 may output additional information to an area (for example, a display area displayed according to a size adjustment of a second display area while the first display area scrolls) prepared in a changed second display area.

When a first display area is outputted to the display 150, the second display area processing module 174 may control to output to the display 150 a second display area including specified information (for example, information relating to a first display area) by default or in correspondence to an event occurrence. First display area related information, for example, may include a virtual input pad for inputting characters to an input window or search window of a first display area. According to various embodiments, the first display area related information may include a control key relating to an execution control of an application in execution in relation to a first display area. In certain embodiments, specified information may include a defined virtual input pad by default.

According to various embodiments, the second display area processing module 174 may change a second display area in relation to a scroll function of a first display area (for example, in correspondence to at least one of a scroll speed or direction of a first display area). For example, the second display area processing module 174 may change (for example, change temporarily or gradually) the size of a second display area in relation to a scroll function of a first display area. In certain embodiments, the second display area processing module 174 may change (for example, change temporarily or gradually) the transparency of a second display area in relation to a scroll function of a first display area. In certain embodiments, the second display area processing module 174 may control to display a second display area partially in relation to a scroll function of a first display area. In certain embodiments, the second display area processing module 174 may change the position of a second display area in relation to a scroll function of a first display area. In certain embodiments, the second display area processing module 174 may change an information arrangement (for example, rearrange buttons of a virtual keypad or a virtual keyboard, dispose a virtual keypad including some buttons on the basis of a virtual keypad including a plurality of buttons, or arrange a virtual keypad including other characters or numbers) of a second display area in relation to a scroll function of a first display area.

According to various embodiments, the second display area processing module 174 may change a second display area when a scroll function of a first display area starts. In certain embodiments, the second display area processing module 174 may change a second display area when a predetermined time elapses after a scroll function of a first display area starts. In certain embodiments, the second display area processing module 174 may change a second display area when a scroll function of a first display area ends. In certain embodiments, the second display area processing module 174 may change a second display area while a scroll function of a first display area lasts.

According to various embodiments, the second display area processing module 174 may control a changed second display area restoration in relation to a scroll function termination of a first display area. In certain embodiments, the second display area processing module 174 may control to maintain a changed second display area state in relation to a scroll function termination of a first display area. According to various embodiments, the second display area processing module 174 may control a restoration or maintenance of a second display area in relation to the characteristics of a first display area. For example, when at least part of information displayed in a first display area includes editable information, the second display area processing module 174 may control to restore a second display area. When a first display area includes non-editable information, the second display area processing module 174 may control to maintain a change state of a second display area. Whether editable information is included may be defined according to the characteristics of an application displayed in a first display area. In relation to this, the electronic device 100 may include a definition table for editable information or non-editable information by each application or each information displayed according to execution of an application.

As mentioned above, according to various embodiments, an electronic device may include a display displaying a first display area and a second display area and a display control module changing the second display area gradually in correspondence to a scroll operation occurring from the first display area.

According to various embodiments, the display control module may control to gradually change at least one of the size and transparency of the second display area in correspondence to the scroll operation or partially change the second display area in correspondence to the scroll operation.

According to various embodiments, the display control module may control at least one of a gradual size reduction or enlargement of the second display area, a gradual transparency increase or decrease of the second display area, and a gradual increase or decrease of a displayed portion in the second display area, in correspondence to at least one of the scroll speed and direction.

According to various embodiments, the display control module may maintain a changed second display area state when the scroll operation ends.

According to various embodiments, the display control module may maintain the changed second display area state in the case that information disposed in the first display area is non-editable information when the scroll operation ends.

According to various embodiments, the display control module may restore the second display area to a, state before the scroll operation when the scroll operation ends.

According to various embodiments, the display control module may restore the second display area to a state before the scroll operation in the case that information disposed in the first display area is editable information when the scroll operation ends.

According to various embodiments, the display control module may control to display additional information in the first display area in correspondence to the second display area change.

According to various embodiments, the display control module may control to gradually change the second display area to be invisible on a display in correspondence to the scroll operation and display the second display area in a state before the scroll operation when the scroll operation ends.

According to various embodiments, the display control module may control to output a virtual keypad to the second display area.

Figure 3:
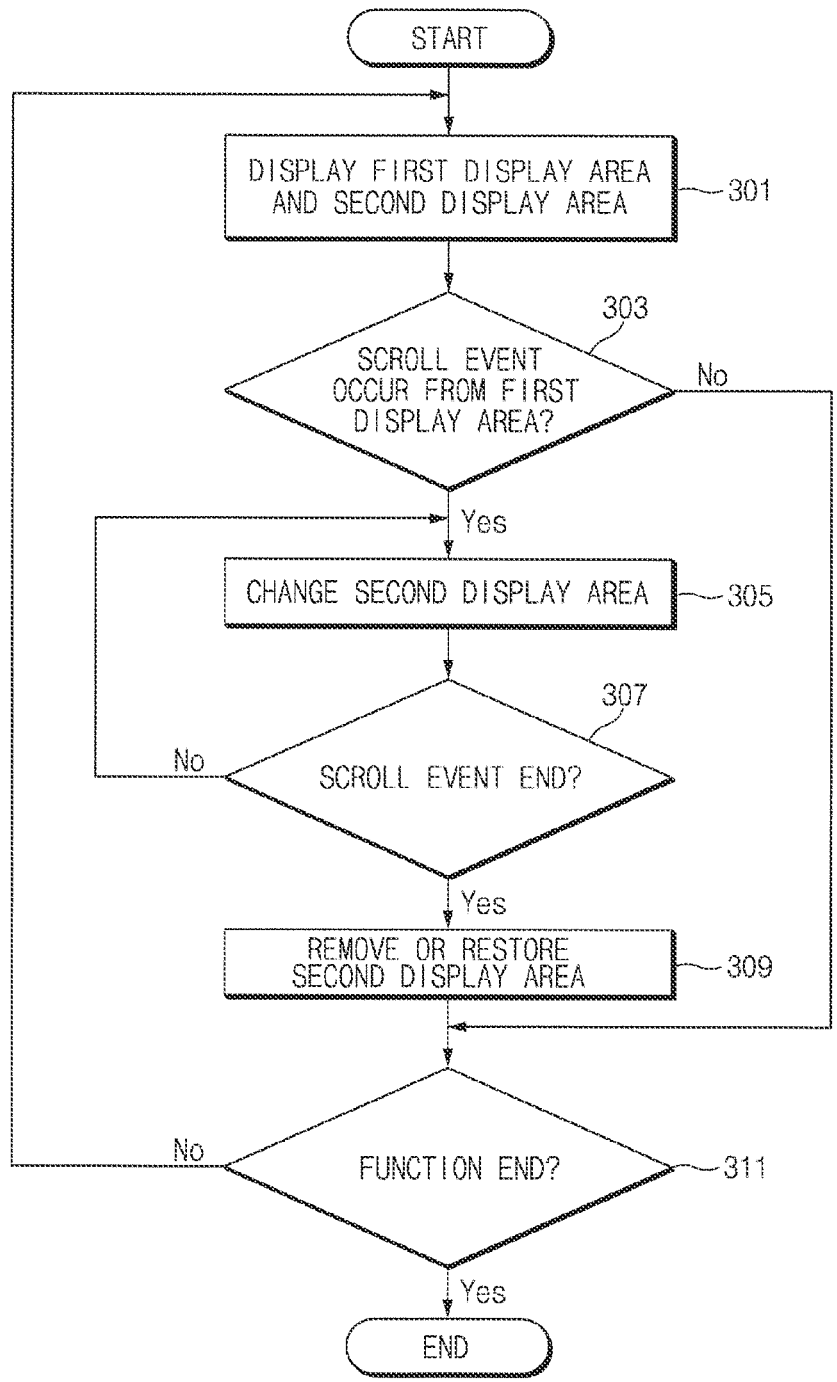
FIG. 3 illustrates an electronic device management method according to various embodiments of the present disclosure.

FIG. 3 illustrates an electronic device management method according to various embodiments of the present disclosure.

In operation 301, the electronic device 100 may process a first display area and second display area display. In relation to this, when a scrollable information display is requested (for example, at least one of an input event, schedule event, and communication event relating to a scrollable information display occurs), the display control module 170 of the electronic device 100 may control to display a first display area including scrollable information on the display 150. The display control module 170 may control to display a second display area relating to the first display on the display 150 at the same time. In certain embodiments, the display control module 170 may control to display the first display area on the display 150 and, when a specific event relating to the first display area or a specific event for calling the second display area occurs, display the second display area on the display 150. According to an embodiment, the display control module 170 may control to dispose the second display area in a partial area of the first display area top. In certain embodiments, the display control module 170 may dispose the first display area and the second display area in the divided areas of the display 150.

In operation 303, the display control module 170 may check whether a scroll event occurs from the first display area. In operation 305, when a scroll event occurs from the first display area, the display control module may process a second display area change. For example, the display control module 170 may control at least one of a size change, transparency change, position change, information arrangement change, and partial change of the second display area.

In operation 307, it is possible to check whether an event corresponding to scroll termination occurs. For example, the display control module 170 may check whether a drag event relating to scroll is released. In certain embodiments, the display control module 170 may check whether a duration time of a flick event set in relation to scroll arrives. When a new flick event occurs within a flick event duration time, the display control module 170 may process it as a continuing scroll event. According to various embodiments, when a new scroll event occurs before a scroll operation of the first display area ends, the display control module 170 may process it as a continuing scroll event. In certain embodiments, even when a scroll operation of the first display area ends, when a scroll event occurs within a predetermined time, the display control module 170 may process it as a continuing scroll event.

When the scroll event does not end, the display control module 170 may branch into operation 305 and perform the subsequent operations again. In operation 309, when the scroll event ends, the display control module 170 may control to remove (or maintain a changed state) or restore the second display area. For example, in correspondence to setting, the display control module 170 may maintain a second display area removal state or restore the second display. According to various embodiments, the display control module 170 may control the removal or restoration of the second display area in correspondence to the characteristics of an application being executed in the first display area. For example, when information displayed in the first display area includes specified information (for example, editable information and information set to require a second display area use), the display control module 170 may restore the second display area to a state before scroll event occurrence or a specified particular state. When the information displayed in the first display area is not specified information, the display control module 170 may control to remove the second display area or maintain a changed state.

In operation 311, the display control module 170 may check whether an event (for example, the termination of a function for changing the second display area when a scroll event occurs from the first display area) occurs. When there is no function termination related event, the display control module 170 may support to branch into operation 301 and perform the subsequent processes again. When there is no scroll event occurrence in the first display area in operation 303, the display control module 170 may branch into operation 311. In certain embodiments, when there is no scroll event occurrence in the first display area for a specified time, the display control module 170 may process a sleep mode (for example, a function for turning-off the display 150) entry.

As mentioned above, according to various embodiments, a screen management method may include displaying a first display area and a second display area and changing the second display area gradually in correspondence to a scroll operation occurring from the first display area.

According to various embodiments, the changing of the second display may include at least one of gradually changing at least one of the size and transparency of the second display area in correspondence to the scroll operation or partially displaying the second display area in correspondence to the scroll operation.

According to various embodiments, the changing of the second display may include gradually reducing or enlarging the size of the second display area in correspondence to at least one of the scroll speed and direction, gradually increasing or decreasing the transparency of the second display area in correspondence to at least one of the scroll speed and direction, or gradually decreasing or increasing a displayed portion in the second display area in correspondence to at least one of the scroll speed and direction.

According to various embodiments, the method may further include maintaining a changed second display area state when the scroll operation ends.

According to various embodiments, the method may further include maintaining the changed second display area state in the case that information disposed in the first display area is non-editable information when the scroll operation ends.

According to various embodiments, the method may further include restoring the second display area to a state before the scroll operation when the scroll operation ends.

According to various embodiments, the method may further include restoring the second display area to a state before the scroll operation in the case that information disposed in the first display area is editable information when the scroll operation ends.

According to various embodiments, the method may further include displaying additional information in the first display area in correspondence to the second display area change.

According to various embodiments, the changing of the second display may include gradually changing the second display area to be invisible on a display in correspondence to the scroll operation and displaying the second display area in a state before the scroll operation when the scroll operation ends.

According to various embodiments, the second display area may output a virtual keypad or a virtual keyboard.

As mentioned above, according to various embodiments, a screen management method may include displaying a first display area and a second display area and differently displaying a change form of the second display area in correspondence to the characteristics of information displayed on the first display area and a scroll operation occurring from the first display area.

According to various embodiments, the differently displaying of the second display may include at least one of changing at least one of the size and transparency of the second display area in correspondence to the scroll operation, partially displaying the second display area in correspondence to the scroll operation, and rearranging information of the second display area in correspondence to the scroll operation.

According to various embodiments, the differently displaying of the second display may include differently changing a form of the second display area in correspondence to information characteristics of an application screen changed in the first display area according to the scroll operation.

According to various embodiments, the differently displaying of the second display may include maintaining the changed second display area state in the case that information disposed in the first display area is non-editable information when the scroll operation ends.

According to various embodiments, the differently displaying of the second display may include restoring a changed second display area state to a state before the scroll operation in the case that information disposed in the first display area is editable information when the scroll operation ends.

According to various embodiments, the method may further include displaying additional information in the first display area in correspondence to the second display area change.

According to various embodiments, the differently displaying of the second display may include at least one of gradually changing at least one of the size and transparency of the second display area in correspondence to the scroll operation and partially displaying the second display area in correspondence to the scroll operation.

According to various embodiments, the differently displaying of the second display may include gradually reducing or enlarging the size of the second display area in correspondence to at least one of the scroll speed and direction, gradually increasing or decreasing the transparency of the second display area in correspondence to at least one of the scroll speed and direction, and gradually decreasing or increasing a displayed portion in the second display area in correspondence to at least one of the scroll speed and direction.

Figure 4:
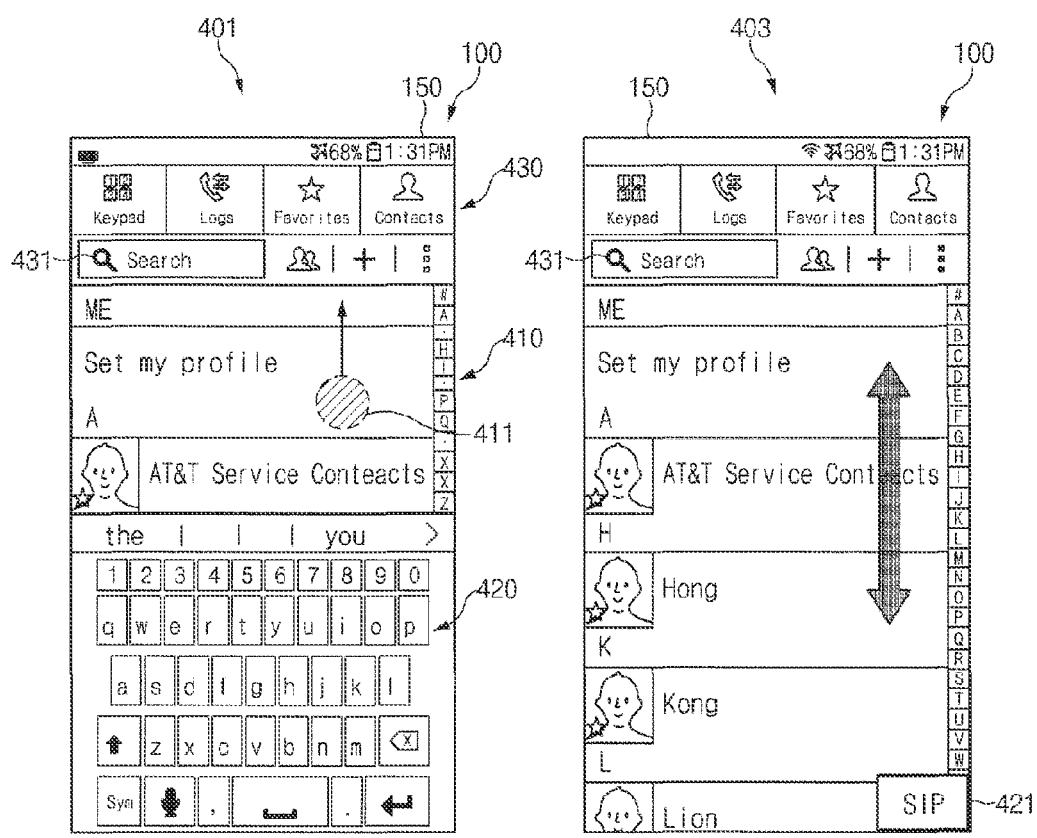
FIG. 4 illustrates a second display change according to a scroll even in a list screen according to various embodiments of the present disclosure.

FIG. 4 illustrates a second display change according to a scroll event in a list screen according to various embodiments of the present disclosure.

Referring to FIG. 4, according to various embodiments, as shown in a state 401, the display control module 170 of the electronic device 100 may control to output list information to a display area 410. The display control module 170 may control to display a display area 420 including information specified by default (for example, information relating to a display area 410 management, for example, a virtual input pad) together with the display area 410. According to various embodiments, the display control module 170 may control to allow the display area 410 including list information to display the entire display 150 or an area including an area where the display area 420 is displayed. The display control module 170 may adjust the size of the display area 410 in correspondence to an event occurrence (for example, an event for selecting a specific item of the display area 410 or an event for selecting a specific key of the display area 430 where virtual keys relating to a screen control are disposed. The display control module 170 may control to display the adjusted display area 420 on the display 150. In certain embodiments, the display control module 170 may control to display the display area in a partial area of the display area 410.

According to various embodiments, the display control module 170 may collect a touch event 411 occurring on the display area 410. The display control module 170 may check the type of the touch event 411 and may control processing of a display area 410 corresponding to the touch event 411. For example, as shown in a state 403, the display control module 170 may process the display area 410 to scroll in correspondence to the touch event 411. The display control module 170 may change the display area 420. For example, the display control module 170 may convert the display area 420 into a specified area 411 and dispose it at a screen one side (for example, a certain position of the display area 410). The display area 411 may include information (for example, at least one of a text and image indicating a virtual input pad) relating to the display area 420.

According to various embodiments, the display control module 170 may maintain a display area 421 display state while a scroll function lasts in the display area 401. When the scroll function ends in the display area 410, the display control module 170 may control to remove the display area 411 and then output the display area 420. The display control module 170 may perform the state 403 again when the scroll function is performed again in the display area 410.

According to various embodiments, the display control module 170 may control the restoration of the display area 420 or the display state maintenance of the display area 411 in correspondence to the characteristics of information displayed in the display area 410. For example, when non-editable information (for example, information that is not directly edited in the currently displayed screen and requires an additional menu (for example, depth) movement) is displayed, the display control module 170 may control to maintain a state in which the display area 420 is removed. In certain embodiments, the display control module 170 may control to maintain a display area 411 state. According to various embodiments, when a specific item 431 of the display area 430 is selected or the display area 411 is selected, the display control module 170 may control to display the display 420.

Figure 5:
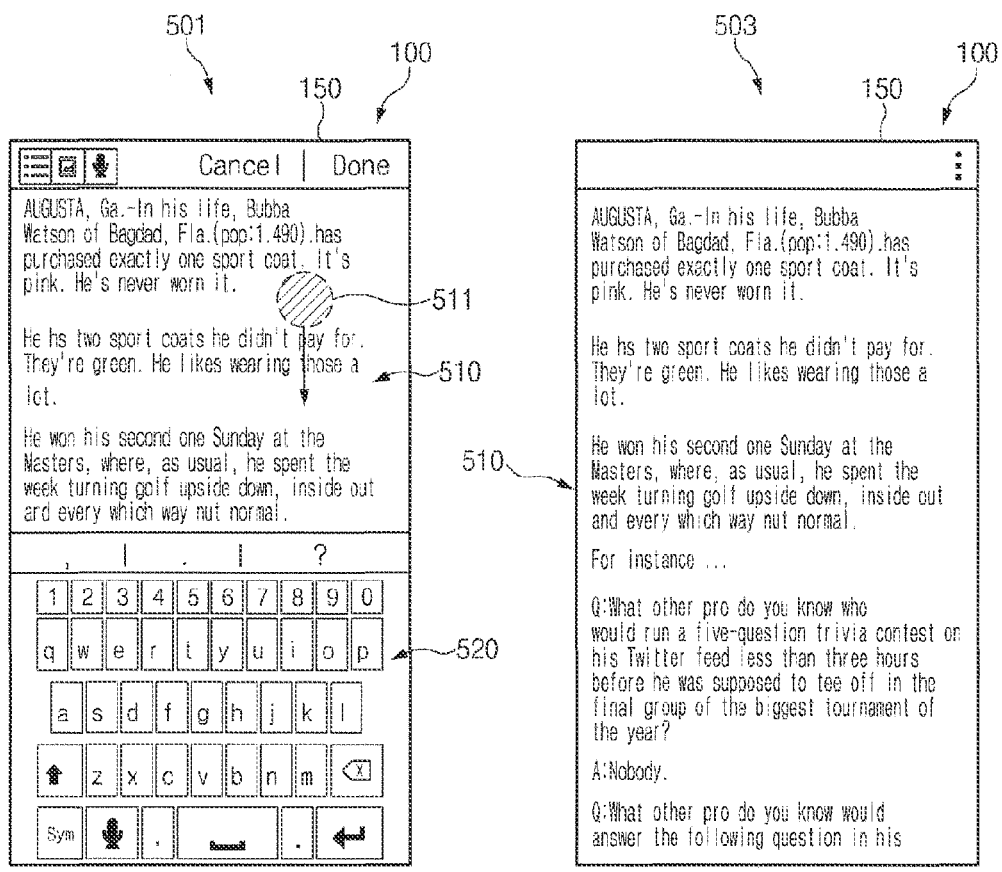
FIG. 5 illustrates a second display area change depending on a scroll event in a document screen according to various embodiments of the present disclosure.

FIG. 5 illustrates a second display area change depending on a scroll event in a document screen according to various embodiments of the present disclosure.

Referring to FIG. 5, according to various embodiments, the display control module 170 of the electronic device 100 may display a display area 510 including document information in a predetermined area of the display 150 as shown in a state 501 in correspondence to a user input, setting, or a communication event occurrence. The display control module 170 may display a display area 520 together with the display area 510.

The display control module 170 may collect a touch event 511 occurring from the display area 510. In correspondence to a touch event 511 occurrence, as shown in a state 503, the display control module 170 may control to display the display 150 in full screen. For example, when a touch down event for touching a predetermined point of the display area 510 occurs, the display control module 170 may remove the display area 520 from the display 150. The display control module 170 may display additional information of the display area 510 in an area where the display area 520 is removed.

When a touch drag event occurs, the display control module 170 may process a scroll operation of the display area 510. According to various embodiments, while the display area 510 scrolls or when a touch down event or a touch drag event occurs within a predetermined time after a scroll operation ends, the display control module 170 may control to maintain a state in which the display area 520 is removed. When a scroll operation of the display area 510 is completed or a predetermined time elapses after a scroll operation, the display control module 170 may control to display the display area 520 again.

At least part of the display area 520 may include at least one virtual key button (for example, a copy, move, cut, or delete virtual key button) for editing the document displayed in the display area 510. In certain embodiments, the display area 520 may include search buttons for searching the document of the display area 510 for a specific text. In certain embodiments, the display area 520 may include at least one virtual key button (for example, a character keypad, a numeric keypad, and a special character keypad) for inputting information to the document displayed in the display area 510.

Figure 6:
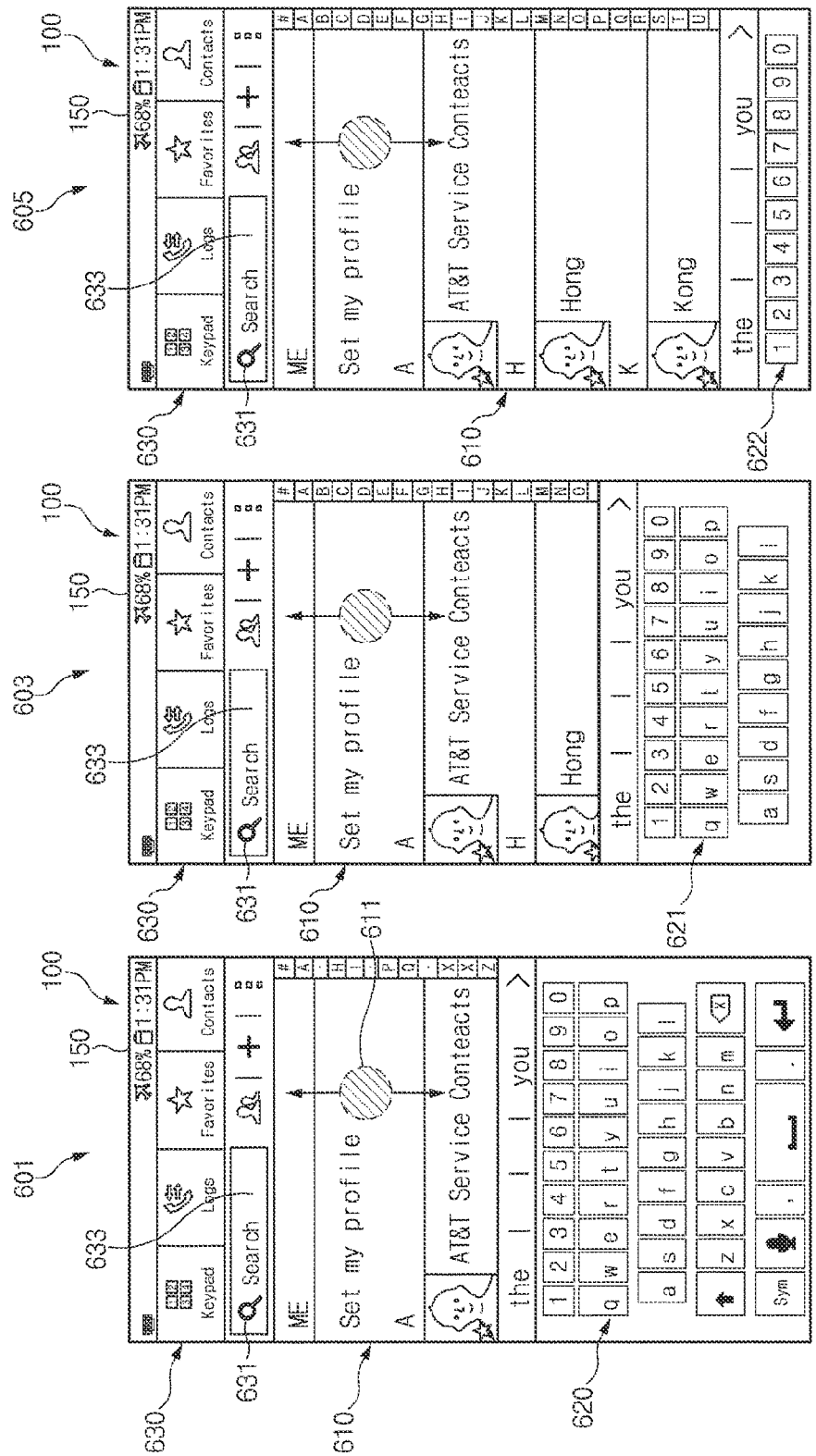
FIG. 6 illustrates a partial change of a second display area depending on a scroll event in a list screen according to various embodiments of the present disclosure.

FIG. 6 illustrates a partial change of a second display area depending on a scroll event in a list screen according to various embodiments of the present disclosure.

Referring to FIG. 6, the display control module 170 of the electronic device 100 may control to output a display area 610 including list information and a display area 630 including information relating to the display area 610. When a search item 631 disposed in the display area 630 is selected, as shown in a state 601, the display control module 170 may control to output a display area 620 to the display 150.

When an event 611 (for example, a touch event or hovering event relating to a scroll operation performance of the display area 610) specified in relation to the display area 610 occurs, the display control module 170 may control to display changed display areas 620, 621, and 622 on the display 150 as shown in a state 603 and a state 605. The display control module 170 may change the display area 620 into a display area 621 shown in a state 603 and a display area 622 shown in a state 605 in correspondence to a scroll operation performance or a time elapse in the display area 601. In correspondence to a specified time elapse after the state 605, the display control module 170 may remove the changed display area 622 from the display 150. In certain embodiments, the display control module 170 may control to maintain the display area 622 while a scroll operation occurs in the display area 610.

According to various embodiments, the display control module 170 may control a change of the display area 620 in correspondence to at least one of the scroll moving speed and direction. For example, the display control module 170 may perform a change in the order of the display area 620, the display area 621, and the display area 622 in a section where a scroll moving speed is increased. The display control module 170 may perform a change in the order of the display area 622, the display area 621, and the display area 620 in a section where a scroll moving speed is decreased. The display control module 170 may control to display the display area 622 in a section where a scroll moving speed is increased and then remove the display area 622 from the display 150. Additionally, while not displaying the display area 622 for a specified time in a section where a scroll moving speed starts to be decreased, the display control module 170 may control to display the display area 622 in correspondence to the specified time elapse. As mentioned above, the display control module 170 may control to at least partially change the display area 620 in correspondence to a scroll operation in the display area 610.

According to various embodiments, in correspondence to a partial change of the display area 620, the display control module 170 may partially change the amount or size of information displayed in the display area 610. For example, the display control module 170 may gradually increase the amount or size of information displayed in the display area 610 in correspondence to at least one change of a scroll speed and direction. In certain embodiments, the display control module 170 may gradually decrease the amount or size of information displayed in the display area 610 in correspondence to at least one decrease of a scroll speed and direction.

According to various embodiments, the display control module 170 may control to gradually increase the size of the display area 610 in a section where a scroll speed or distance is increased and maintain a state in which the display area 620 is removed regardless of a scroll speed after the display area 620 is removed from the display 150. When a scroll operation is completed, the display control module 170 may control to restore the size or the display area 620 gradually or at once.

According to various embodiments, the display control module 170 may display, on a search input window 633, characters or numbers that a touch event occurring from the display area 620 indicates. The display control module 170 may perform an information search corresponding to a search word including characters or numbers inputted through the search input window 633. The display control module 170 may rearrange information displayed in the display area 610 to correspond to the search word inputted to the search input window 633. When a scroll operation is performed on the display area 610 displaying the rearranged information, the display control module 170 may remove the display area 620 from the display 150 temporarily. When a scroll operation is completed, the display control module 170 may control to automatically restore the display area 620. When a touch event occurs from the display area 620, the display control module 170 may perform information search by combining information that the touch event indicates with the search word previously inputted to the search input window 633.

For example, when the search word "a" is inputted, the display control module 1170 searches for information relating to "a" to output it the display area 610. The display control module 170 may control to display "a" on the search input window 633. When a scroll operation occurs from the display area 610 (for example, a touch event or hovering event for scrolling the display area 610 or a gesture event relating to a device movement occurs), the display control module 170 may remove the display area 620 from the display 150 temporarily. The display control module 170 may control to maintain the search word "a" on the search input window 633. When the scroll operation ends in the display area 610, the display control module 170 may control to automatically display the display area 620 on the display 150. The size of the display 610 may be changed or a displayed area may be limited. When the search word "b" is inputted as a touch event occurs from the display area 620, the display control module 170 searches for information including the search word "a" and the search word "b" and outputs it to the display area 610. The display area 620 may be removed partially over time and disappear or may be displayed partially over time and displayed in full screen.

Figure 7:
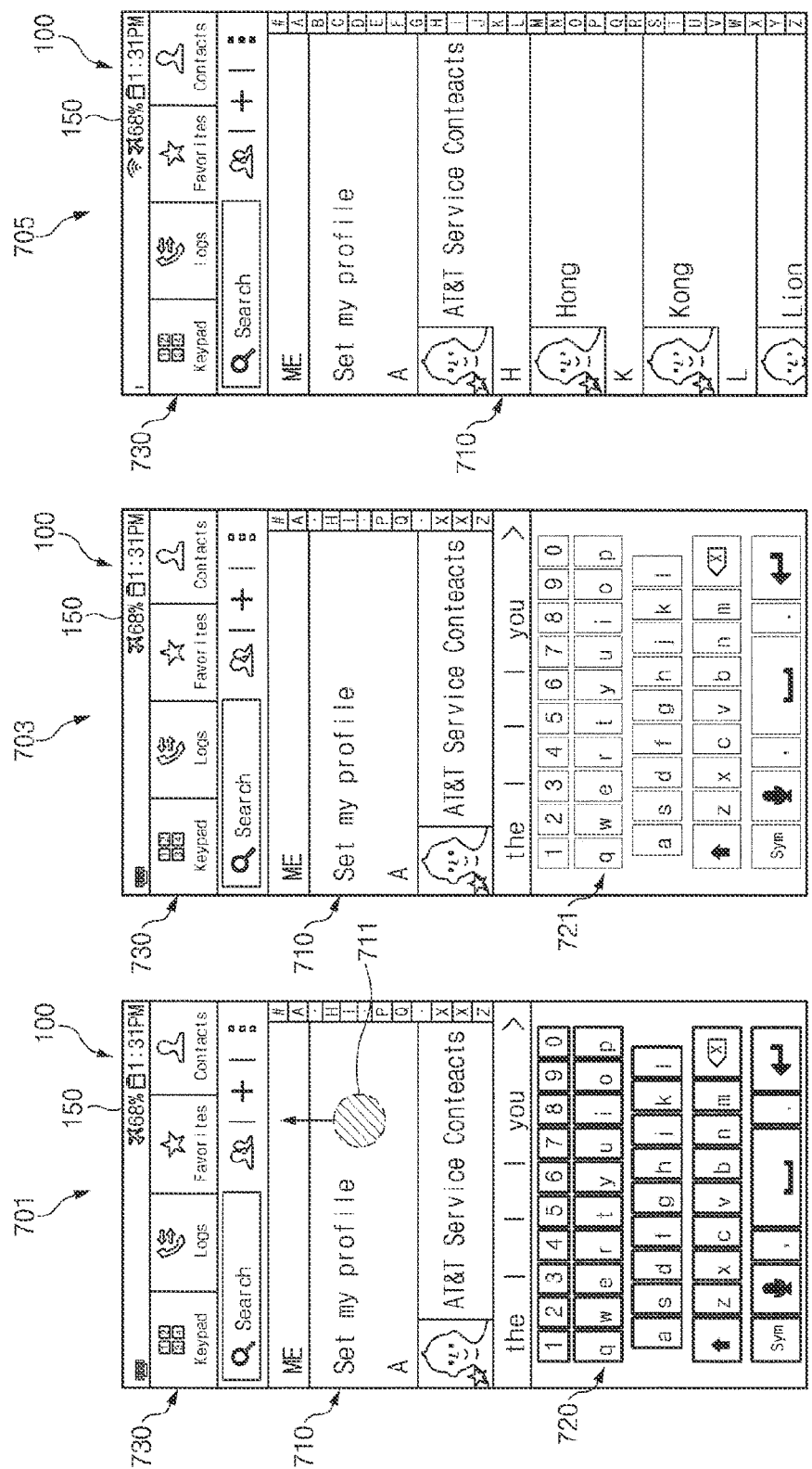
FIG. 7 illustrates a transparency change of a second display area depending on a scroll event in a scrollable screen according to various embodiments of the present disclosure.

FIG. 7 illustrates a transparency change of a second display area depending on a scroll event in a scrollable screen according to various embodiments of the present disclosure.

Referring to FIG. 7, according to various embodiments, the display control module 170 of the electronic device 100 may output a display area 710 where scrollable information is disposed and a display area 720 relating to the display area 710 as shown in a state 701. Additionally, the display control module 170 may control to display a display area 730 on a display 150. According to an embodiment, the display control module 170 may change the transparency of the display area 720 in correspondence to a scroll operation performed based on an event 711 occurring from the display area 710. For example, the display control module 170 may change the display area 720 into a semi-transparent display area 721 shown in a state 703 or a transparent state as shown in a state 705, in correspondence to a scroll operation.

For example, according to a time elapse after a scroll operation occurs, the display control module 170 may gradually change the transparency of the display area 720. In certain embodiments, the display control module 170 may change the transparency of the display area 720 in correspondence to a scroll speed. For example, the display control module 170 performs a control to increase the transparency of the display area 720 in a section where a scroll speed is increased to disappear gradually on the display 150 and decrease the transparency of the display area 720 in a section where a scroll speed is decreased to be displayed gradually on the display 150. For example, the display control module 170 may change the transparency of the display area 720 to the maximum in a section where a scroll speed is more than a predetermined speed to process (for example, the state 705) the display area 720 to be invisible on the display 150. The display control module 170 may gradually change the transparency of the display area 720 in a section where a scroll speed is less than a predetermined speed to process the display area 720 to be visible gradually on the display 150.

According to various embodiments, the display control module 170 may process a transparency change differently in correspondence to the characteristics of information displayed in the display area 710. For example, when information displayed in the display area 710 is editable information, the display control module 170 may change the transparency of the display area 720 temporarily. Then, the display control module 170 may restore the display area 720 to an initial state (for example, the state 701) at a scroll operation termination time point. In certain embodiments, when information displayed in the display area 710 is non-editable information or screen switching is necessary in relation to editing, the display control module 170 may change the transparency of the display area 720 temporarily during a scroll operation. The display control module 170 may perform processing to continuously maintain a state (for example, the state 703 or the state 705) in which the transparency of the display area 720 is changed. The display area 720 may change to be transparent gradually and then may be removed from the display 150.

Figure 8:
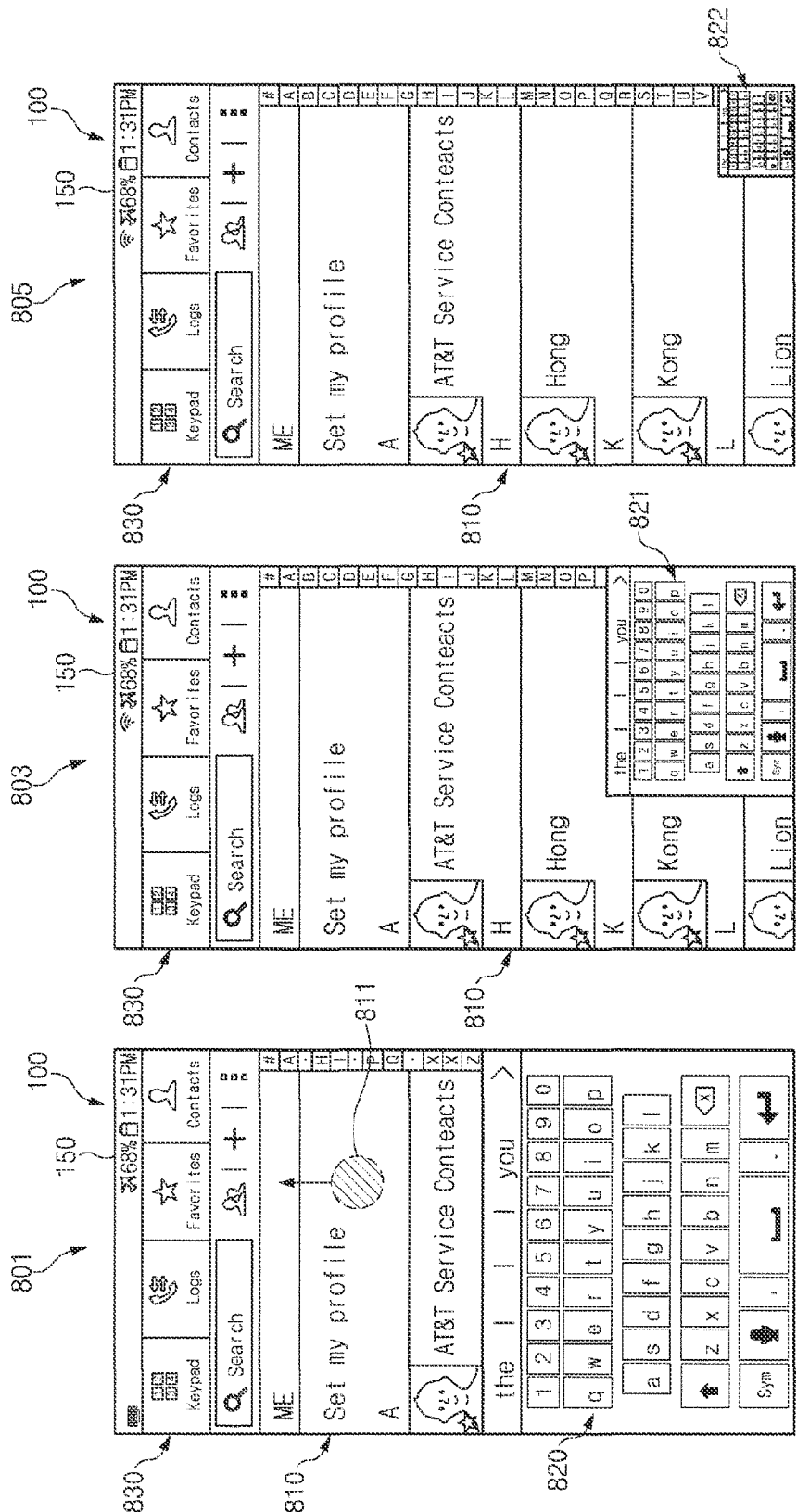
FIG. 8 illustrates a size change of a second display area depending on a scroll event in a scrollable screen according to various embodiments of the present disclosure.

FIG. 8 illustrates a size change of a second display area depending on a scroll event in a scrollable screen according to various embodiments of the present disclosure.

Referring to FIG. 8, according to various embodiments, the display control module 170 of the electronic device 100 may output a display area 810 where scrollable information is disposed and a display area 820 relating to the display area 810 as shown in a state 801. The display control module 170 may change the sizes of display areas 821 and 822 as shown in a state 803 and a state 805 in correspondence to a scroll operation (for example, a scroll operation generated based on an event 811) occurring from the display area 810. For example, the display control module 170 may control to gradually reduce the size of the display area 820 in order to output a display area 821 and a display area 822 in order or gradually enlarge the size of the display area 822 in order to output the display area 821 and the display area 820 in order in correspondence to a scroll speed change.

According to various embodiments, the display control module 170 may differently change the size of the display area 820 in correspondence to the characteristics of information displayed in the display area 810. For example, when a scroll operation occurs while editable information is displayed in the display area 810, the display control module 170 may perform a size change of the display area 820. When a scroll operation ends, the display control module 170 may process to change the display area 820 into a reduced state as shown in the display area 822 or remove the display area 820 from the display 150 (for example, the state 801). As another example, when a scroll operation occurs while non-editable information is displayed in the display area 810, the display control module 170 may perform a size change of the display area 820. When a scroll operation ends, the display control module 170 may control to maintain a state (for example, a display area 822 state in which the display area 820 is reduced to a specified predetermined size or a state in which the display area 820 is removed from the display 150) in which the display area 820 is changed.

According to various embodiments, the display control module 170 may output at least one of the display area 821 and the display area 822 in correspondence to the characteristics (for example, a scroll speed or drag distance) of an occurring event. For example, the display control module 170 may change the display area 820 into the display area 821 in correspondence to a drag distance of a drag event. In certain embodiments, the display control module 170 may change the display area 821 into the display area 822 in correspondence to a drag distance. In certain embodiments, the display control module 170 may change the display area 820 into the display area 821 or change the display area 821 into the display area 822 in correspondence to a dragged direction. In certain embodiments, the display control module 170 may change the display area 822 into the display area 821 or change the display area 821 into the display area 820 in correspondence to a dragged direction.

Figure 9:
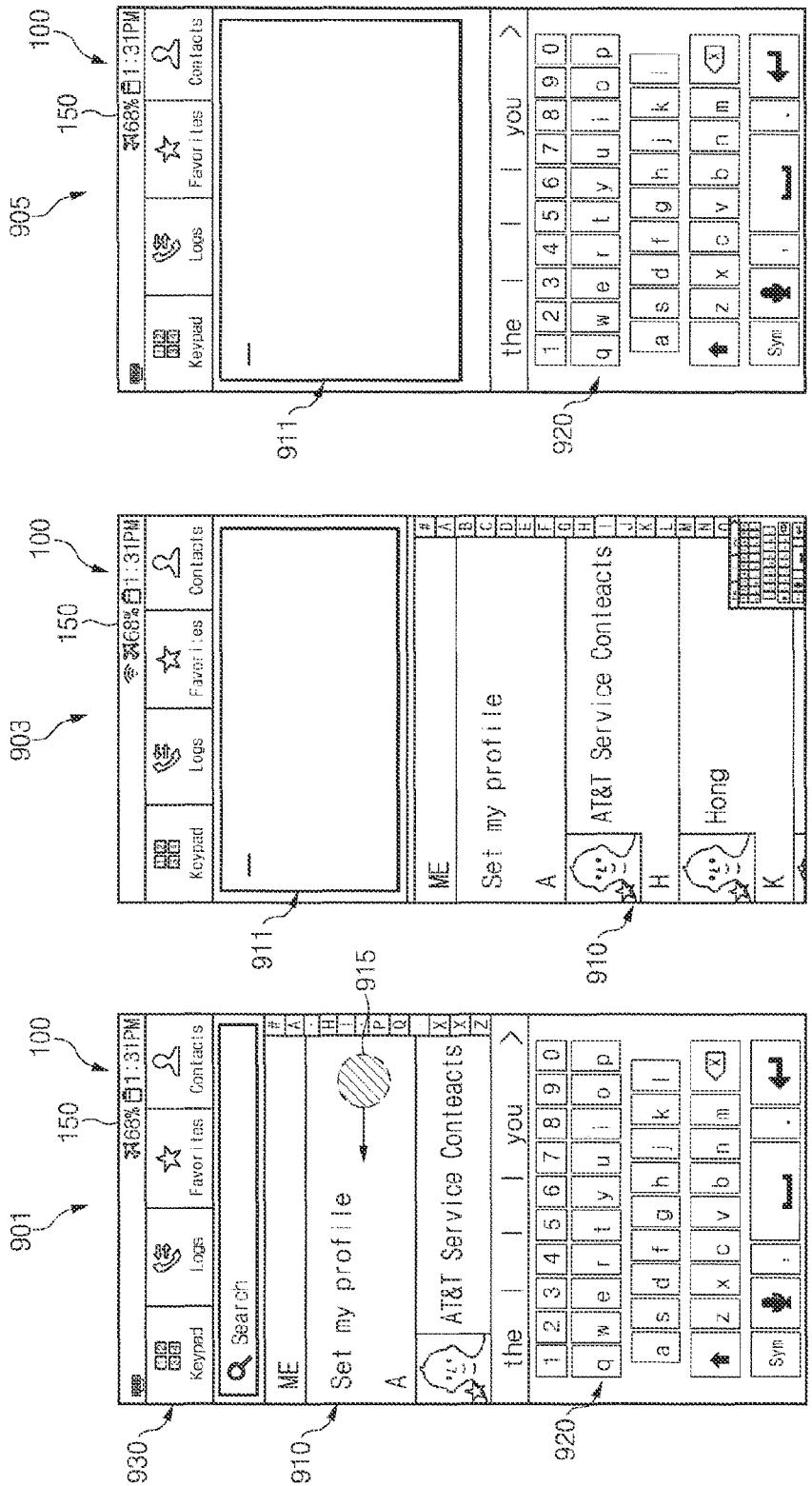
FIG. 9 illustrates a second display area change depending on a side-scroll event in a scrollable screen according to various embodiments of the present disclosure.

FIG. 9 illustrates a second display area change depending on a side-scroll event in a scrollable screen according to various embodiments of the present disclosure.

Referring to FIG. 9, as shown in a state 901, the display control module 170 of the electronic device 100 may control to output a display area 910 and a display area 920 to a display 150. When a side-scroll event 915 occurs from the display area 910, the display control module 170 may control screen switching in correspondence to the side-scroll event 915. The display control module 170 may change the display area 910 into the display area 921 as shown in a state 903. When a scroll operation ends in the display area 911 or a specified time elapses after a scroll operation, the display control module 170 may control to display the display area 921 in the display area 911 as shown in a state 905. The display area 911 may display another application in correspondence to a side-scroll operation. For example, at least one of recently used application screens may be displayed in the display area 911 in correspondence to a side-scroll event.

The display control module 170 may differently perform the display maintenance or removal of the display areas 920 and 921 according to information characteristics of the display areas 910 and 911. For example, when editable information of a specific application is displayed in the display area 910 or 911, the display control module 170 may restore the display area 920 as shown in a state 905. When non-editable information of a specific application is displayed in the display area 910 or 911, the display control module 170 may maintain the display area 920 in a display area 921 state or remove it from the display 150.

Figure 10:
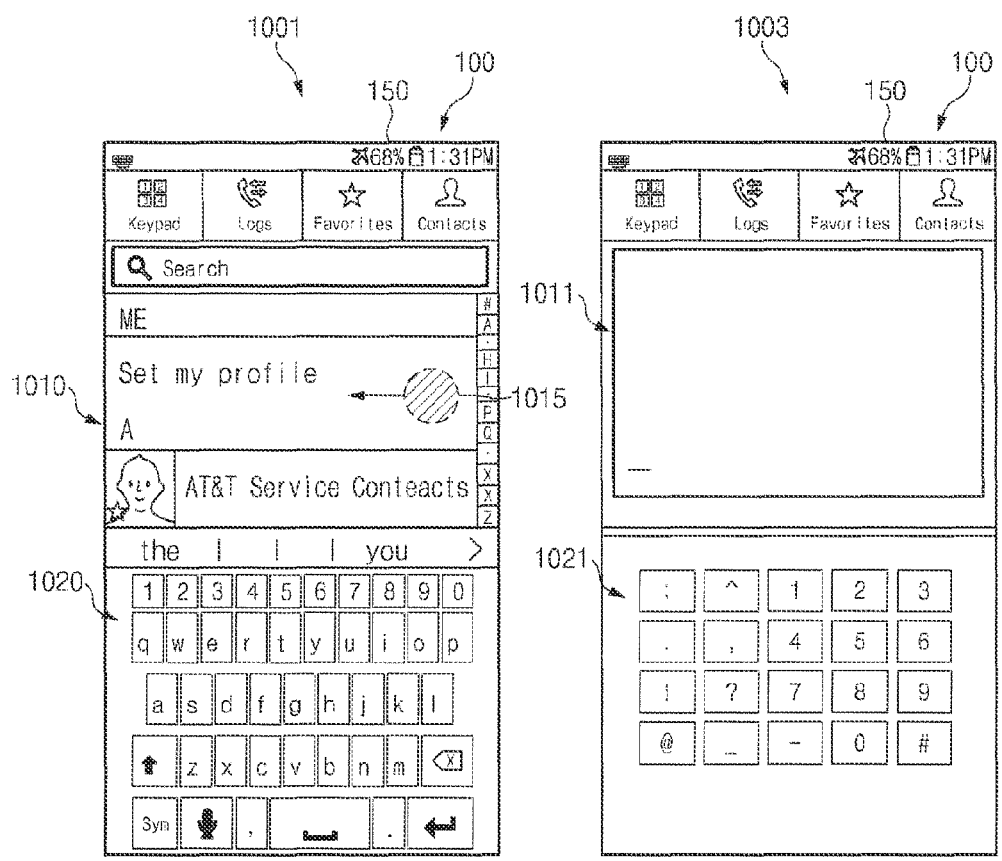
FIG. 10 illustrates an information arrangement change of a second display area depending on a side-scroll event in a scrollable screen according to various embodiments of the present disclosure.

FIG. 10 illustrates an information arrangement change of a second display area depending on a side-scroll event in a scrollable screen according to various embodiments of the present disclosure.

Referring to FIG. 10, as shown in a state 1001, the display control module 170 of the electronic device 100 may control to output a display area 1010 and a display area 1020 to a display 150. When a side-scroll event 1015 occurs from the display area 1010, the display control module 170 may control screen switching in correspondence to the side-scroll event 1015. The display control module 170 may change the display area 1020 into the display area 1021 as shown in a state 1003. According to various embodiments, the display area 1020 may display a virtual QWERTY keypad and the display area 1021 may display a numeric keypad. In relation to this, the display control module 170 may differently change information of the display area 1020 or the display area 1021 in correspondence to the characteristics of information displayed in the display area 1010 or 1011. For example, when document information is displayed in the display area 1010 or 1011, the display control module 170 may dispose a QWERTY keypad on the display 150 as shown in the display area 1020. When album information, schedule information, or gallery information (for example, at least one picture information) is displayed in the display area 1010 or 1011, the display control module 170 may dispose a numeric keypad on the display 150 as shown in the display area 1021.

Figure 11:
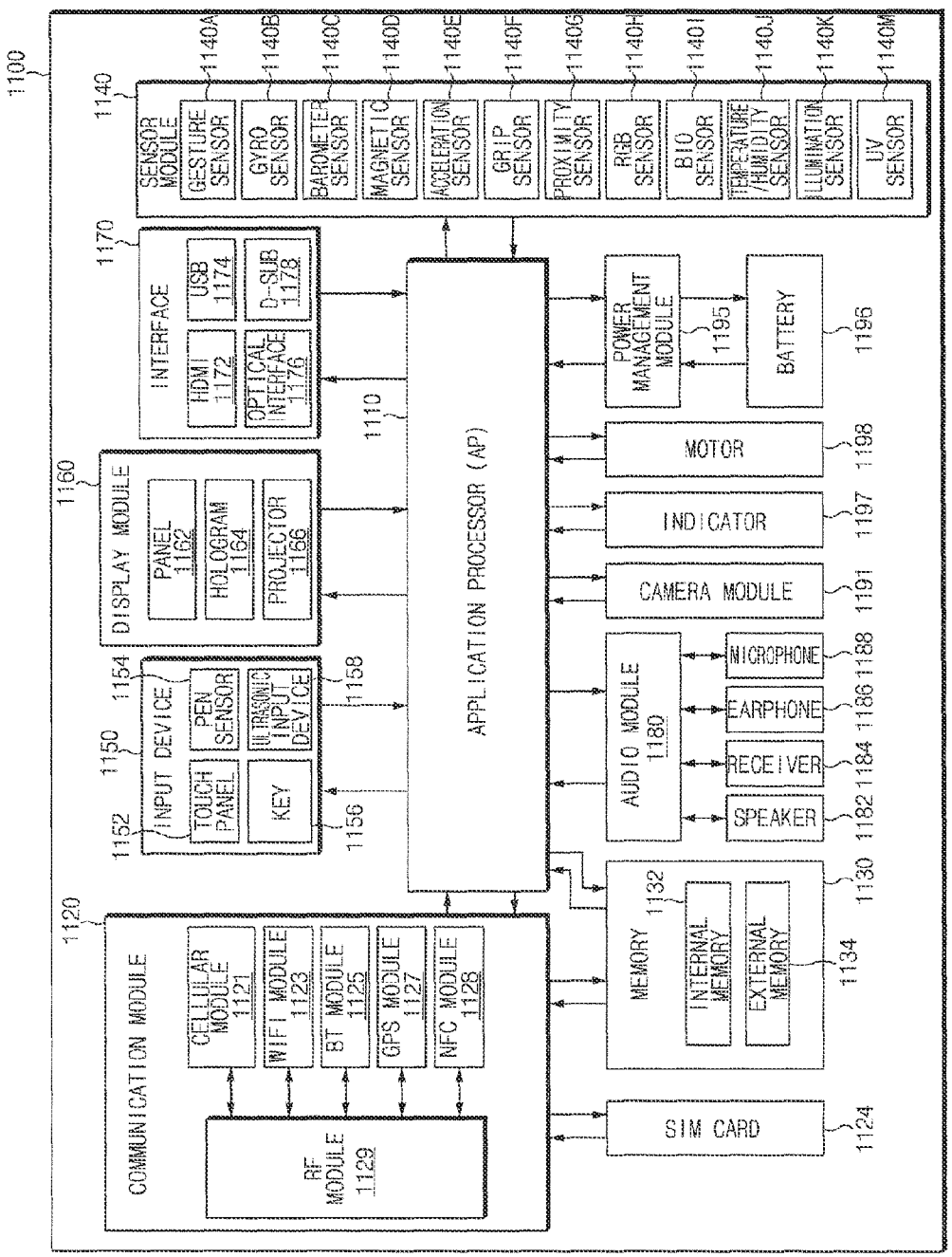
FIG. 11 illustrates rates an electronic device according to various embodiments of the present disclosure.

FIG. 11 illustrates an electronic device according to various embodiments of the present disclosure.

Referring to FIG. 11, the electronic device 1100, for example, may configure all or part of the above-mentioned electronic device 100 shown in FIG. 1. Referring to FIG. 11, the electronic device 1100 includes at least one application processor (AP) 1110 (for example, the processor 120 and the display control module 170, a communication module 1120 (for example, the communication interface 160), a subscriber identification module (SIM) card 1124, a memory 1130 (for example, the memory 130), a sensor module 1140, an input device 1150 (for example, the input/output interface 140), a display 1160 (for example, the displays 150), an interface 1170 (for example, the input/output interface 140), an audio module 1180, a camera module 1191, a power management module 1195, a battery 1196, an indicator 1197, and a motor 1198.

The AP 1110 may control a plurality of hardware or software components connected to the AP 1110 and also may perform various data processing and operations with multimedia data by executing an operating system or an application program. The AP 1110 may be implemented with a system on chip (SoC), for example. According to an embodiment of the present disclosure, the AP 1110 may further include a graphic processing unit (GPU) (not shown).

The communication module 1120 (for example, the communication interface 160) may perform data transmission or reception through a communication between other electronic devices (for example, the electronic device 104 or the server device 106) connected to the electronic device 1100 (for example, the electronic device 100) via a network. According to various embodiments of the present disclosure, the communication module 1120 may include a cellular module 1121, a WiFi module 1123, a BT module 1125, a GPS module 1127, an NEC module 1128, and a radio frequency (RF) module 1129.

The cellular module 1121 may provide voice calls, video calls, text services, or internet services through a communication network (for example, LTE, CDMA, WCDMA, UMTS, WiBro, or GSM). The cellular module 1121 may perform a distinction and authentication operation on an electronic device in a communication network by using a subscriber identification module (for example, the SIM card 1124), for example. According to an embodiment, the cellular module 1121 may perform at least part of a function that the AP 1110 provides. For example, the cellular module 1121 may perform at least part of a multimedia control function.

According to an embodiment of the present disclosure, the cellular module 1121 may further include a communication processor (CP). Additionally, the cellular module 1121 may be implemented with SoC, for example. As shown in FIG. 11, components such as the cellular module 1121 (for example, a CP), the memory 1130, or the power management module 1195 are separated from the AP 1110, but according to an embodiment of the present disclosure, the AP 1110 may be implemented including some of the above-mentioned components (for example, the cellular module 1121).

According to an embodiment of the present disclosure, the AP 1110 or the cellular module 1121 (for example, a CP) may load instructions or data, which are received from a nonvolatile memory or at least one of other components connected thereto, into a volatile memory and then may process them. Furthermore, the AP 1110 or the cellular module 1121 may store data received from or generated by at least one of other components in a nonvolatile memory.

Each of the WiFi module 1123, the BT module 1125, the GPS module 1127, and the NEC module 1128 may include a processor for processing data transmitted or received through a corresponding module. Although the cellular module 1121, the Wi-Fi module 1123, the BT module 1125, the GPS module 1127, and the NEC module 1128 are shown as separate blocks in FIG. 11, according to various embodiments of the present disclosure, some (for example, at least two) of the cellular module 1121, the Wi-Fi module 1123, the BT module 1125, the GPS module 1127, and the NEC module 1128 may be included in one integrated chip (IC) or an IC package. For example, at least some (for example, a CP corresponding to the cellular module 1121 and a WiFi processor corresponding to the WiFi module 1123) of the cellular module 1121, the WiFi module 1123, the BT module 1125, the GPS module 1127, and the NEC module 1128 may be implemented with one SoC.

The RE module 1129 may be responsible for data transmission, for example, the transmission of an RE signal. Although not shown in the drawings, the RF module 1129 may include a transceiver, a power amp module (PAM), a frequency filter, or a low noise amplifier (LNA). Additionally, the RE module 1129 may further include components for transmitting or receiving electromagnetic waves on a free space in a wireless communication, for example, conductors or conducting wires. Although the cellular module 1121, the Wi-Fi module 1123, the BT module 1125, the GPS module 1127, and the NEC module 1128 share one RE module 1129 shown in FIG. 11, according to various embodiments of the present disclosure, at least one of the cellular module 1121, the Wi-Fi module 1123, the BT module 1125, the GPS module 1127, and the NEC module 1128 may perform the transmission of an RE signal through an additional RE module.

The SIM card 1124 may be a card including a subscriber identification module and may be inserted into a slot formed at a specific position of an electronic device. The SIM card 1124 may include unique identification information (for example, an integrated circuit card identifier (ICCID)) or subscriber information (for example, an international mobile subscriber identity (IMSI)).

The memory 1130 (for example, the memory 130) may include an internal memory 1132 or an external memory 1134. The internal memory 1132 may include at least one of a volatile memory (for example, dynamic RAM (DRAM), static RAM (SRAM), synchronous dynamic RAM (SDRAM)) and anon-volatile memory (for example, one time programmable ROM (OTPROM), programmable ROM (PROM), erasable and programmable ROM (EPROM), electrically erasable and programmable ROM (EEPROM), mask ROM, flash ROM, NAND flash memory, and NOR flash memory).

According to various embodiments of the present disclosure, the internal memory 1132 may be a Solid State Drive (SSD). The external memory 1134 may further include flash drive, for example, compact flash (CP), secure digital (SD), micro Micro-SD, Mini-SD, extreme digital (xD), or a memorystick. The external memory 1134 may be functionally connected to the electronic device 1100 through various interfaces. According to various embodiments of the present disclosure, the electronic device 1100 may further include a storage device (or a storage medium) such as a hard drive.

The sensor module 1140 measures physical quantities or detects an operating state of the electronic device 1100, thereby converting the measured or detected information into electrical signals. The sensor module 1140 may include at least one of a gesture sensor 1140A, a gyro sensor 1140B, a barometric pressure sensor 1140C, a magnetic sensor 1140D, an acceleration sensor 1140E, a grip sensor 1140F, a proximity sensor 1140G, a color sensor 1140H (for example, a red, green, blue (RGB) sensor), a biometric sensor 1140I, a temperature/humidity sensor 1140J, an illumination sensor 1140K, and an ultra violet (UV) sensor 1140M. In certain embodiments, the sensor module 1140 may include an E-nose sensor (not shown), an electromyography (EMG) sensor, an electroencephalogram (EEG) sensor (not shown), an electrocardiogram (ECG) sensor (not shown), an infrared (IR) sensor (not shown), an iris sensor (not shown), or a fingerprint sensor (not shown). The sensor module 1140 may further include a control circuit for controlling at least one sensor therein.

The input device 1150 may include a touch panel 1152, a (digital) pen sensor 1154, a key 1156, or an ultrasonic input device 1158. The touch panel 1152 may recognize a touch input through at least one of capacitive, resistive, infrared, or ultrasonic methods, for example. Additionally, the touch panel 1152 may further include a control circuit. In the case of the capacitive method, both direct touch and proximity recognition are possible. The touch panel 1152 may further include a tactile layer. In certain embodiments, the touch panel 1152 may provide a tactile response to a user.

The (digital) pen sensor 1154 may be implemented through a method similar or identical to that of receiving a user's touch input or an additional sheet for recognition. The key 1156 may include a physical button, a touch key, an optical key, or a keypad, for example. The ultrasonic input device 1158, as a device checking data by detecting sound waves through a microphone (for example, a microphone 1188) in the electronic device 1100, may provide wireless recognition through an input tool generating ultrasonic signals. According to various embodiments, the electronic device 1100 may receive a user input from an external device (for example, a computer or a server) connected to the electronic device 1100 through the communication module 1120.

According to various embodiments, the input device 1150 may support an event occurrence in a first display area. For example, the input device 1150 may support the generation of a touch event and hovering event relating to a scroll operation of the first display area.

The display 1160 (for example, the display 150) may include a panel 1162, a hologram device 1164, or a projector 1166. The panel 1162 may include a liquid-crystal display (LCD) or an active-matrix organic light-emitting diode (AM-OLED). The panel 1162 may be implemented to be flexible, transparent, or wearable, for example. The panel 1162 and the touch panel 1152 may be configured with one module. The hologram 1164 may show three-dimensional images in the air by using the interference of light. The projector 1166 may display an image by projecting light on a screen. The screen, for example, may be placed inside or outside the electronic device 1100. According to various embodiments, the display 1160 may further include a control circuit for controlling the panel 1162, the hologram device 1164, or the projector 1166.

A first display area including information (for example, editable information or non-editable information) according to a specific application execution and a second display area including information relating to the first display area or the specific application execution may be disposed on the display 1160. The second display area may be changed and displayed in correspondence to a scroll operation occurring from the first display area. For example, the second display area may be changed gradually in correspondence to a scroll operation or a time elapse after a scroll operation occurrence.

The interface 1170 may include a high-definition multimedia interface (HDMI) 1172, a universal serial bus (USB) 1174, an optical interface 1176, or a D-subminiature (sub) 1178, for example. The interface 1170 may be included in the communication interface 160 shown in FIG. 11, for example. The interface 1170 may include a mobile high-definition link (MIL) interface, a secure Digital (SD) card/multi-media card (MMC) interface, or an infrared data association (IrDA) standard interface.

The audio module 1180 may convert sound into electrical signals and convert electrical signals into sounds. At least some components of the audio module 1180 may be included in the input/output interface 140 shown in FIG. 1, for example. The audio module 1180 may process sound information inputted/outputted through a speaker 1182, a receiver 1184, an earphone 1186, or a microphone 1188.

The camera module 1191, as a device for capturing a still image and a video, may include at least one image sensor (for example, a front sensor or a rear sensor), a lens (not shown), an image signal processor (TSP) (not shown), or a flash (not shown) (for example, an LED or a xenon lamp).

The power management module 1195 may manage the power of the electronic device 1100. Although not shown in the drawings, the power management module 1195 may include a power management IC (PMIC), a charger IC, or a battery or fuel gauge, for example.

The PMIC may be built in an IC or SoC semiconductor, for example. A charging method may be classified into a wired method and a wireless method. The charger IC may charge a battery and may prevent overvoltage or overcurrent flow from a charger. According to an embodiment, the charger IC may include a charger IC for at least one of a wired charging method and a wireless charging method. As the wireless charging method, for example, there is a magnetic resonance method, a magnetic induction method, or an electromagnetic method. An additional circuit for wireless charging, for example, a circuit such as a coil loop, a resonant circuit, or a rectifier circuit, may be added.

The battery gauge may measure the remaining amount of the battery 1196, or a voltage, current, or temperature of the battery 1196 during charging. The battery 1196 may store or generate electricity and may supply power to the electronic device 1100 by using the stored or generated electricity. The battery 1196, fir example, may include a rechargeable battery or a solar battery.

The indicator 1197 may display a specific state of the electronic device 1100 or part thereof (for example, the AP 1110), for example, a booting state, a message state, or a charging state. The motor 1198 may convert electrical signals into mechanical vibration. Although not shown in the drawings, the electronic device 1100 may include a processing device (for example, a CPU) for mobile TV support. A processing device for mobile TV support may process media data according to the standards such as digital multimedia broadcasting (DMB), digital video broadcasting (DVB), or media flow.

A screen managing method and electronic device disclosed in various embodiments may display information of a display area where a user input occurs or obtain a display area by adaptively performing display processing of a display area where an input does not occur.

Additionally, various embodiments may display various information in an area obtained based on adaptive display processing of a specific display area.

Each of the above-mentioned components of the electronic device according to various embodiments of the present disclosure may be configured with at least one component and the name of a corresponding component may vary according to the kind of an electronic device. An electronic device according to various embodiments of the present disclosure may include at least one of the above-mentioned components, may not include some of the above-mentioned components, or may further include another component. Additionally, some of components in an electronic device according to various embodiments of the present disclosure are configured as one entity, so that functions of previous corresponding components are performed identically.

The term "module" used in various embodiments of the present disclosure, for example, may mean a unit including a combination of at least one of hardware, software, and firmware. The term "module" and the term "unit," "logic," "logical block," "component," or "circuit" can be interchangeably used A "module" can be a minimum unit or part of an integrally configured component. A "module" can be a minimum unit performing at least one function or part thereof. A "module" can be implemented mechanically or electronically. For example, "module" according to various embodiments of the present disclosure includes at least one of an application-specific integrated circuit (ASIC) chip performing certain operations, field-programmable gate arrays (FPGAs), or a programmable-logic device, all of which are known or to be developed in the future.

According to various embodiments, at least part of a device (for example, modules or functions thereof) or a method (for example, operations) according to this disclosure, for example, as in a form of a programming module, is implemented using an instruction stored in computer-readable storage media. When at least one processor (for example, the processor 120) executes an instruction, it performs a function corresponding to the instruction. The non-transitory computer-readable storage media includes the memory 130, for example. At least part of a programming module is implemented (for example, executed) by the processor 120, for example. At least part of a programming module includes a module, a program, a routine, sets of instructions, or a process to perform at least one function, for example.

The computer-readable storage media includes Magnetic Media such as a hard disk, a floppy disk, and a magnetic tape, Optical Media such as Compact Disc Read Only Memory (CD-ROM) and Digital Versatile Disc (DVD), Magneto-Optical Media such as Floptical Disk, and a hardware device especially configured to store and perform a program instruction (for example, a programming module) such as Read Only Memory (ROM), Random Access Memory (RAM), and flash memory. Additionally, a program instruction includes high-level language code executable by a computer using an interpreter in addition to machine code created by a compiler. The hardware device is configured to operate as at least one software module to perform an operation of various embodiments and vice versa.

A module or a programming module according to various embodiments includes at least one of the above-mentioned components, may not include some of the above-mentioned components, or further includes another component. Operations performed by a module, a programming module, or other components according to various embodiments of the present disclosure are executed through a sequential, parallel, repetitive or heuristic method. Additionally, some operations are executed in a different order or may be omitted. Or, other operations are added.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An electronic device screen management method comprising:
   displaying contents in a first display area of a touch screen display and an input interface in a second display area;
   receiving a drag input via the first display area of the touch screen display;
   scrolling the contents in the first display area;
   in response to releasing of the drag input, continuing scrolling of the contents in the first display area during a given time; and
   changing the second display area during the scrolling of the contents in the first display area after release of the drag input,
   wherein the changing of the second display area comprises:
      when a speed of scrolling of the contents increases, reducing a size of the second display area, and
      when the speed of scrolling of the contents decreases, enlarging the size of the second display area.

2. The method according to claim 1, wherein changing of the second display area comprises:
   changing at least one of a size and transparency of the second display area in correspondence to the scrolling of the contents; or
   partially displaying the second display area in correspondence to scrolling of the contents.

3. The method according to claim 1, wherein changing of the second display area further comprises at least one of:
   gradually increasing or decreasing a transparency of the second display area in correspondence to at least one of the speed and a direction of scrolling of the contents.

4. The method according to claim 1, further comprising maintaining the changed second display area when scrolling of the contents ends.

5. The method according to claim 1, further comprising maintaining the changed second display area when scrolling of the contents ends in a state in which the contents in the first display area is non-editable.

6. The method according to claim 1, further comprising restoring the second display area to a state before scrolling of the contents when scrolling of the contents ends.

7. The method according to claim 1, further comprising restoring the second display area to a state before scrolling of the contents when scrolling of the contents ends if the contents in the first display area is editable.

8. The method according to claim 1, further comprising displaying additional contents in the first display area in correspondence to changing of the second display area.

9. The method according to claim 1, wherein the changing of the second display area comprises:
gradually changing the second display area to be invisible on the touch screen display in correspondence to scrolling of the contents; or
displaying the second display area in a state before scrolling of the contents when scrolling of the contents ends.

10. The method according to claim 1, wherein the input interface is a virtual keypad.

11. An electronic device including:
a touch screen display; and
a processor electrically connected to the touch screen display, wherein the processor is configured to:
  display contents in a first display area of the touch screen display and an input interface in a second display area,
  receive drag input via the first display area of the touch screen display,
  scroll the contents in the first display area,
  in response to releasing of the drag input, continuing scrolling of the contents in the first display area during a given time, and
  change the second display area during scrolling of the contents in the first display area, after a release of the drag input, and
wherein the processor is further configured to:
  when a speed of scrolling of the contents increases, reduce a size of the second display area, and
  when the speed of scrolling of the contents decreases, enlarge the size of the second display area.

12. The device according to claim 11, wherein the processor is further configured to gradually change at least one of a size and transparency of the second display area or partially display the second display area, in correspondence to scrolling of the contents.

13. The device according to claim 11, wherein the processor is further configured to gradually increase or decrease a transparency of the second display area.

14. The device according to claim 11, wherein the processor is further configured to maintain the changed second display area when the scrolling of the contents ends.

15. The device according to claim 11, wherein the processor is further configured to maintain the changed second display area when scrolling of the contents ends in a state in which the contents in the first display area is non-editable.

16. The device according to claim 11, wherein the processor is further configured to restore the second display area to a state before scrolling of the contents when scrolling of the contents ends.

17. The device according to claim 11, wherein the processor is further configured to restore the second display area to a state before scrolling of the contents when scrolling of the contents ends if the contents in the first display area is editable.

18. The device according to claim 11, wherein the processor is further configured to display additional contents in the first display area in correspondence to changing of the second display area.

19. The device according to claim 11, wherein the processor is further configured to:
gradually change the second display area to be invisible on the touch screen display in correspondence to scrolling of the contents; and
display the second display area in a state before scrolling of the contents when scrolling of the contents ends.

20. The device according to claim 11, wherein the input interface is a virtual keypad.

* * * * *